(12) United States Patent
McCugh

(10) Patent No.: US 10,774,560 B1
(45) Date of Patent: Sep. 15, 2020

(54) DRIVEABLE STAKE MEMBER

(71) Applicant: Darrin McCugh, Kingsport, TN (US)

(72) Inventor: Darrin McCugh, Kingsport, TN (US)

(*) Notice: Subject to any disclaimer, the term of this patent is extended or adjusted under 35 U.S.C. 154(b) by 0 days.

(21) Appl. No.: 16/353,521

(22) Filed: Mar. 14, 2019

Related U.S. Application Data

(60) Provisional application No. 62/644,763, filed on Mar. 19, 2018.

(51) Int. Cl.
*E04H 12/22* (2006.01)
*E04H 17/22* (2006.01)
*A01K 1/04* (2006.01)

(52) U.S. Cl.
CPC ......... *E04H 12/2215* (2013.01); *E04H 17/22* (2013.01); *A01K 1/04* (2013.01)

(58) Field of Classification Search
CPC .... B25D 1/16; E02D 7/04; E02D 7/00; E04H 12/2215; E04H 17/22; A01K 1/04
USPC .................. 173/91; 248/530, 156, 545, 508; 40/607.05–607.06; 52/154–155
See application file for complete search history.

(56) References Cited

U.S. PATENT DOCUMENTS

| | | | |
|---|---|---|---|
| 187,337 A * | 2/1877 | Wing ................ | E04H 12/2215 52/154 |
| 266,261 A * | 10/1882 | Copeland ............ | E04H 12/2215 52/154 |
| 284,219 A * | 9/1883 | Mehew ............... | E04H 12/2215 52/154 |
| 299,086 A | 5/1884 | Over | |
| 394,854 A | 12/1888 | Helfenberger et al. | |
| 444,497 A | 1/1891 | Lounsberry | |
| 486,973 A * | 11/1892 | Knox .................. | E04H 12/2215 52/154 |
| 606,558 A | 6/1898 | Ketchum | |
| 798,945 A * | 9/1905 | Berntson ............. | E04H 12/2215 52/154 |
| 821,474 A * | 5/1906 | Dolan ................. | E04H 12/2215 52/154 |
| 1,142,046 A | 6/1915 | Michod | |
| 1,649,249 A | 11/1927 | Newman | |
| 2,022,160 A | 11/1935 | Sorensen | |
| 2,067,890 A | 1/1937 | Collord | |
| 2,282,049 A | 5/1942 | Haggart | |
| 2,485,877 A | 10/1949 | Hamilton, Jr. | |
| 2,759,486 A | 8/1956 | Pesaturo | |

(Continued)

*Primary Examiner* — Ingrid M Weinhold
(74) *Attorney, Agent, or Firm* — Leason Ellis LLP

(57) ABSTRACT

A drivable stake for attachment to an article that includes an elongated stake having a first end section that terminates at a first end and a second end section that terminates at an opposing second end. The elongated stake has impact drive shoulders and a stake plate is coupled to the elongated stake and in contact with the impact drive shoulders. A coupling member surrounding the elongated stake and includes an opening for attachment to the article. A hollow impact drive member slidingly travels along the second end section of the elongated stake for striking the stake plate and driving the first end section into the ground. The stake includes a fastener for coupling the impact drive member to the elongated stake during a driving action and for locking the impact drive member in place relative to the elongated stake in a locked position.

18 Claims, 5 Drawing Sheets

(56) References Cited

U.S. PATENT DOCUMENTS

Figure 5:
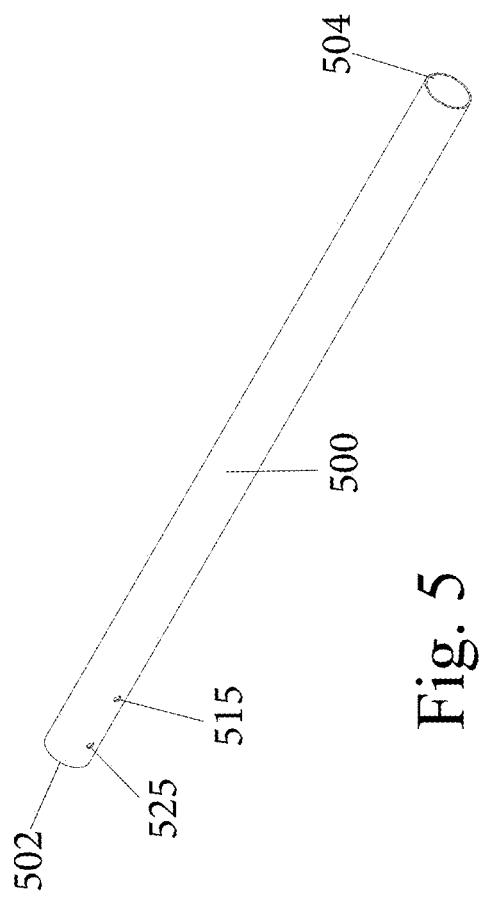

| | | | |
|---|---|---|---|
| 3,381,763 A * | 5/1968 | Matson | E04H 17/18 |
| | | | 173/91 |
| 3,519,234 A | 7/1970 | Matson | |
| 4,101,088 A | 7/1978 | Stauth | |
| 4,249,715 A | 2/1981 | Repp | |
| 4,261,424 A | 4/1981 | Gonterman et al. | |
| 4,279,104 A | 7/1981 | Classen | |
| 4,291,495 A | 9/1981 | Crippen | |
| 4,327,787 A * | 5/1982 | Loratto | B23B 31/113 |
| | | | 144/195.5 |
| 4,378,650 A * | 4/1983 | Ottoson | E02D 5/80 |
| | | | 40/607.06 |
| 4,459,787 A | 7/1984 | Wilcox | |
| 4,589,500 A * | 5/1986 | Moraly | E04H 17/263 |
| | | | 173/90 |
| 4,620,506 A * | 11/1986 | Stubbs | A01K 1/04 |
| | | | 119/780 |
| 4,910,901 A | 3/1990 | Boyar | |
| 4,928,446 A * | 5/1990 | Alexander, Sr. | E02D 5/801 |
| | | | 40/610 |
| 5,020,605 A | 6/1991 | Leishman | |
| 5,031,577 A * | 7/1991 | Flugger | A01K 1/04 |
| | | | 119/780 |
| 5,042,591 A | 8/1991 | Hull | |
| 5,050,828 A | 9/1991 | Wolff | |
| 5,067,683 A | 11/1991 | Wager | |
| 5,085,281 A | 2/1992 | Selly | |
| 5,104,265 A | 4/1992 | Halloran, Jr. | |
| 5,123,623 A * | 6/1992 | McNamara | E04H 12/2253 |
| | | | 248/156 |
| D332,821 S | 1/1993 | Padilla | |
| 5,353,747 A * | 10/1994 | Fain | A01K 1/04 |
| | | | 119/780 |
| 5,699,864 A | 12/1997 | Dvorak | |
| 5,765,321 A | 6/1998 | Barbera | |
| 6,128,867 A * | 10/2000 | MacKarvich | E02D 5/801 |
| | | | 52/155 |
| 6,338,465 B1 | 1/2002 | Stoner | |
| 6,481,364 B2 | 11/2002 | Woyjeck | |
| D470,189 S | 2/2003 | Nguyen | |
| 6,719,249 B2 | 4/2004 | MacIntyre | |
| 6,752,362 B1 | 6/2004 | Gretz | |
| 7,089,694 B2 | 8/2006 | Allen | |
| 7,234,417 B2 * | 6/2007 | Laird | A01K 1/04 |
| | | | 119/61.57 |
| 7,520,485 B1 | 4/2009 | Giannetto | |
| 7,568,306 B1 | 8/2009 | Rice, Sr. | |
| 7,934,567 B1 | 5/2011 | Madey | |
| 9,453,321 B2 * | 9/2016 | Hartman | E02D 7/04 |
| 10,119,293 B1 | 11/2018 | McCugh | |
| 2002/0007775 A1 | 1/2002 | Woyjeck | |
| 2004/0134312 A1* | 7/2004 | Hodges | B25D 1/16 |
| | | | 81/27 |
| 2006/0241647 A1* | 10/2006 | Chen | E04H 17/263 |
| | | | 606/100 |
| 2008/0307721 A1* | 12/2008 | Schultz | E04H 12/2215 |
| | | | 52/157 |
| 2009/0071069 A1 | 3/2009 | Conde | |
| 2010/0133492 A1 | 6/2010 | Langenwalter | |
| 2011/0253876 A1 | 10/2011 | Odell | |
| 2013/0327915 A1* | 12/2013 | O'Neal | E01F 9/685 |
| | | | 248/545 |
| 2014/0020310 A1* | 1/2014 | Lee | E02D 7/22 |
| | | | 52/157 |
| 2015/0048232 A1 | 2/2015 | Hallauer | |
| 2015/0096260 A1* | 4/2015 | Intagliata | E04H 12/2215 |
| | | | 52/741.14 |
| 2016/0256992 A1* | 9/2016 | Macphee | B25F 1/006 |
| 2018/0216306 A1* | 8/2018 | Gregg | E04H 17/22 |

* cited by examiner

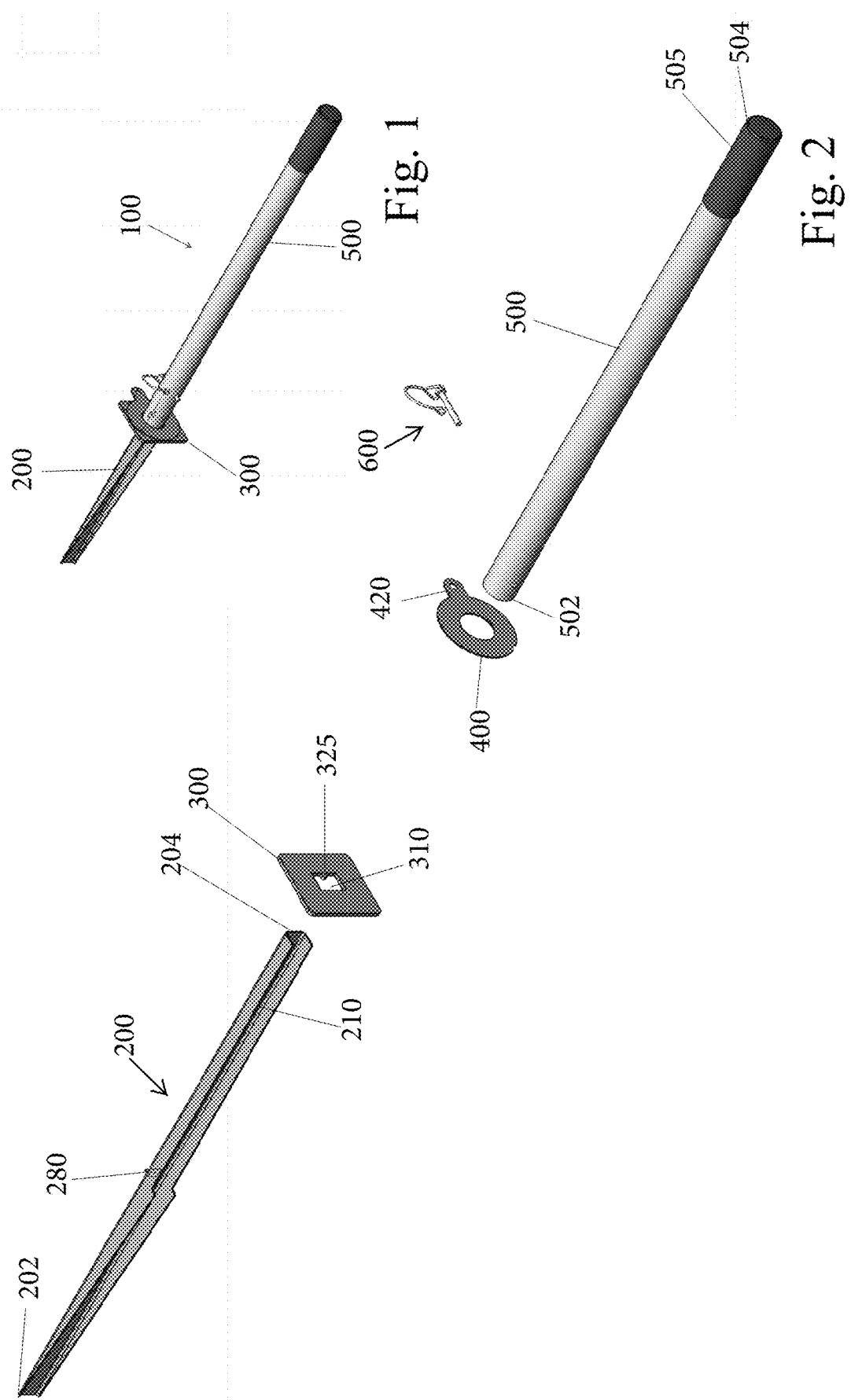

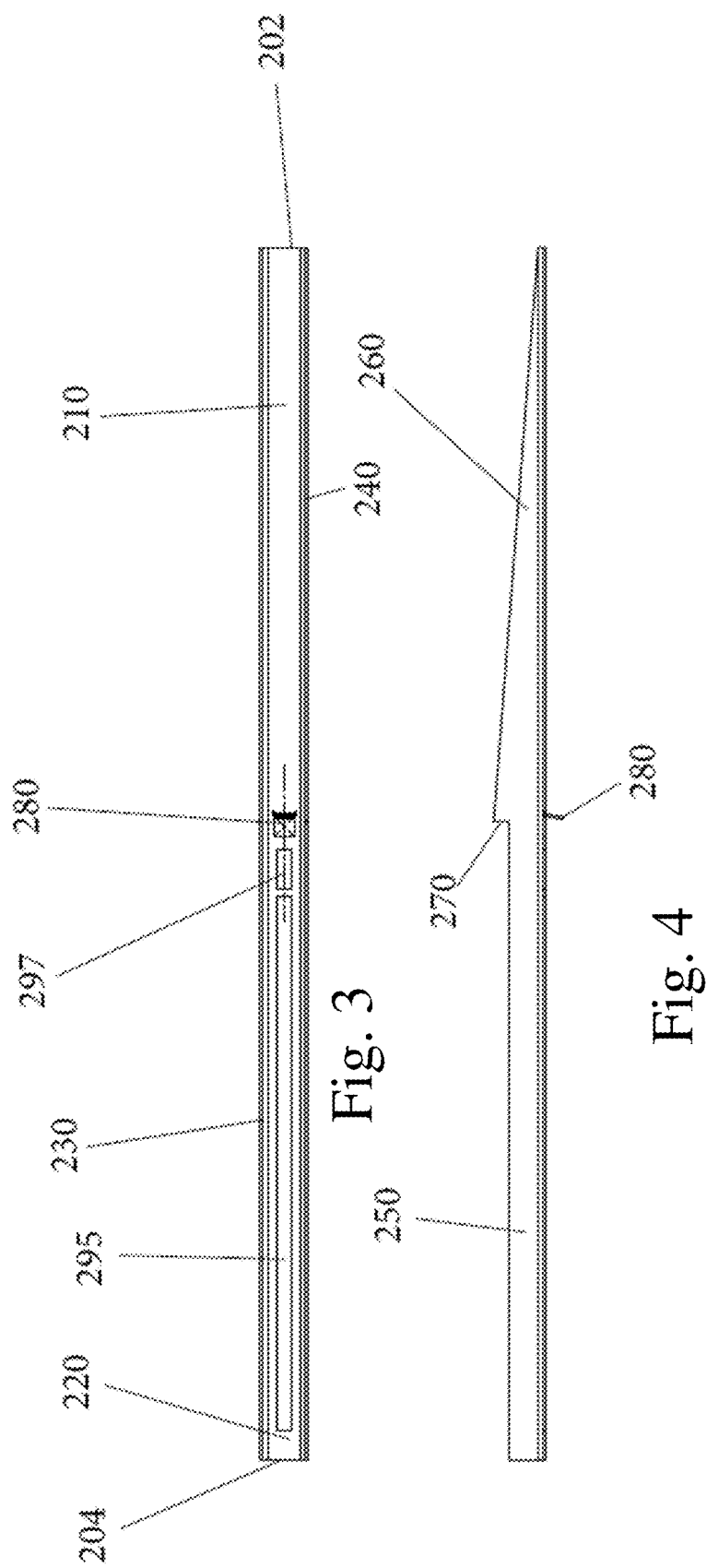

US 10,774,560 B1

DRIVEABLE STAKE MEMBER

CROSS-REFERENCE TO RELATED PATENT APPLICATIONS

This application is based on and claims priority to U.S. Provisional Patent Application 62/644,763, filed Mar. 19, 2018, the entire contents of which is incorporated by reference herein as if expressly set forth in its respective entirety herein.

TECHNICAL FIELD

The present invention relates to a stake that can be driven into the ground and more particularly, to a stake that is configured to be easily driven into and removed from the ground and is configured to easily attach to an article, such as a sign, fence portion, or a dog leash.

BACKGROUND

It can be difficult to drive a sign or post into the ground and requires multiple tools besides the stake itself. For example, a sledge hammer of the like can be used to drive the stake or post into the ground; however, many people do not have the correct tools. It is therefore desirable to provide an improved stake member that can be more easily driven into the ground with less tools or no additional tools.

At times it is desirable to secure a dog's leash to a support that is fixedly attached to a support structure, such as a building or the ground. This is especially true in a grassy yard in which it is desirable to allow the dog to exercise by running around the yard but at the same time, the dog must be prevented from escaping from a yard that does not include a perimeter fence.

SUMMARY

A drivable stake for attachment to an article that includes an elongated stake having a first end section that terminates at a first end and a second end section that terminates at an opposing second end. The elongated stake has a U-shape with a rear wall and two opposing side walls with a longitudinal channel formed between the opposing side walls. Impact drive shoulders being formed perpendicular to the rear wall. A stake plate is coupled to the elongated stake and in contact with the impact drive shoulders and includes pointed side walls that allow the stake plate to be driven into the ground. A hollow impact drive member slidingly travels along the second end section of the elongated stake for striking the stake plate and driving the first end section into the ground. The stake includes a fastener for coupling the impact drive member to the elongated stake during a driving action and for locking the impact drive member in place relative to the elongated stake in a locked position. The fastener passes through the impact drive member and the elongated stage in such a way that the impact drive member can slide longitudinally over the elongated stake during the driving action.

BRIEF DESCRIPTION OF THE DRAWING FIGURES

Figure 6:
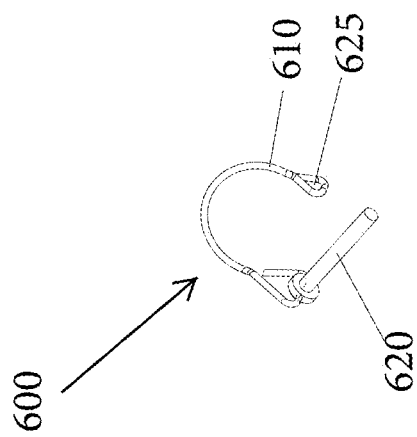
Figure 7:
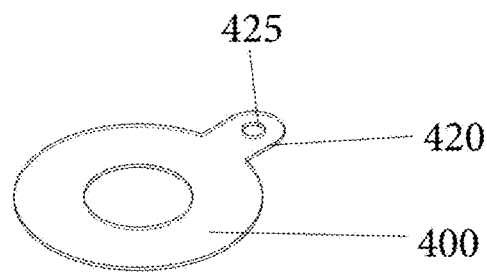
Figure 8:
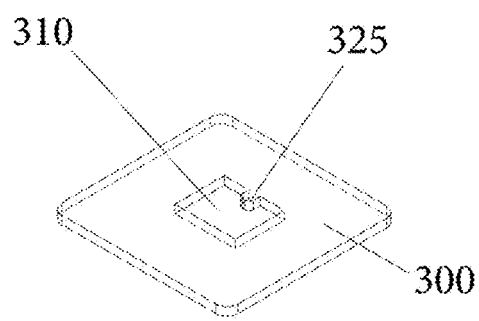
Figure 9:
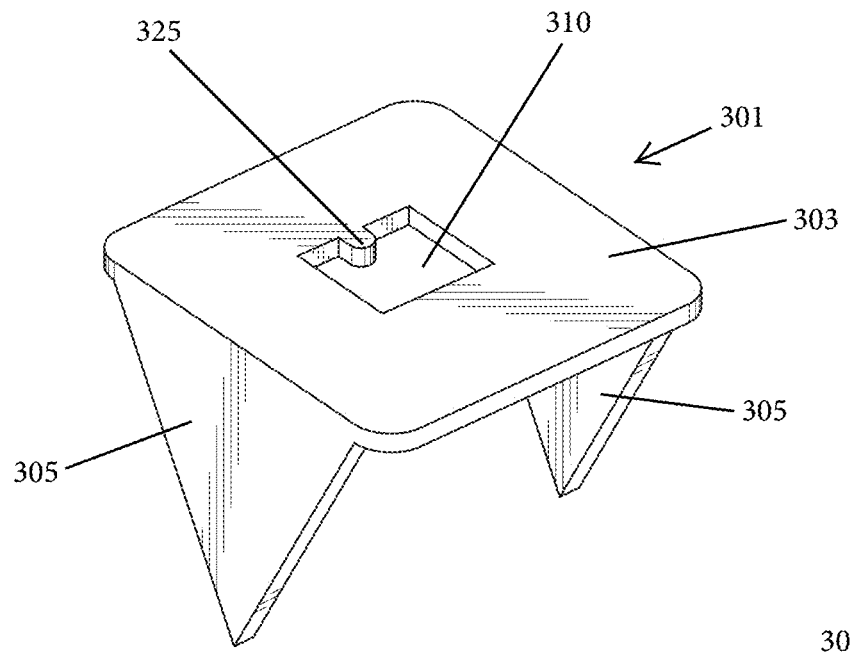
Figure 10:
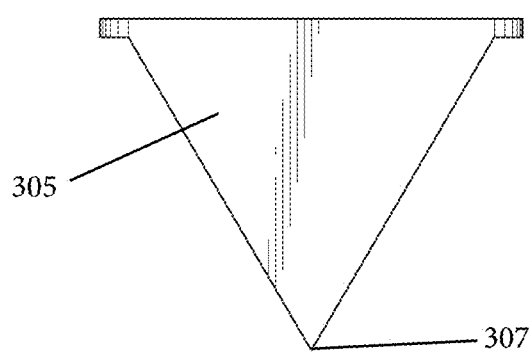
Figure 11:
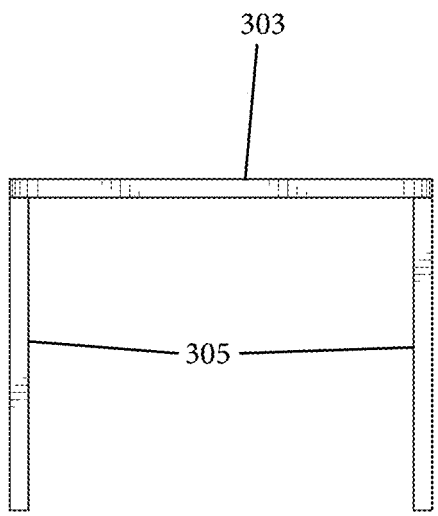

FIG. 1 is a perspective view of a stake that is constructed to be driven into the ground;
FIG. 2 is an exploded perspective view of the stake;
FIG. 3 is a rear elevation view of an elongated stake;
FIG. 4 is a side elevation view of the elongated stake;
FIG. 5 is a perspective view of an impact driver;
FIG. 6 is a perspective view of a fastener;
FIG. 7 is a perspective view of an annular member;
FIG. 8 is a perspective view of a stake plate;
FIG. 9 is a perspective view of an alternative stake plate;
FIG. 10 is a side elevation view of the stake plate; and
FIG. 11 is a front elevation view of the stake plate.

DETAILED DESCRIPTION OF CERTAIN EMBODIMENTS

Referring to FIG. 1-11, the present invention is directed to a stake 100 in accordance with one embodiment of the present invention. In one embodiment, the stake 100 can be used to secure a dog leash; however, this is only one use of the stake and it can be used in many different ways, including but not limited to securing a fence, displaying a sign, such as a real estate sign, etc.

The stake 100 is formed of a number of parts that are removably joined together to form the stake 100. The stake 100 includes an elongated stake 200 that includes a first end 202 which can be thought of as being a distal end and an opposing second end 204 which can be thought of as being a proximal end. As shown in the figures, the elongated stake 200 comprises a three-sided structure that defines a longitudinal channel 210 that extends from the first end 202 and the second end 204. The elongated stake 200 is defined by a rear wall 220, a first side wall 230 and an opposing second side wall 240. As shown in the figures, the first side wall 230 and the second side wall 240 have a non-uniform shape along their lengths. In particular, each of the first side wall 230 and the second side wall 240 can have a first section 250 that terminates at the proximal end 204 and a second section 260 that terminates at the distal end 202. The first section 250 can have a rectangular shape, while the second section 260 has a triangular shape that tapers outwardly in a direction toward the distal end 202. The proximal end of the second section 260 extends radially outward beyond the first section 250, thereby defining a ledge or shoulder 270. Thus, there are two opposing ledges 270 that define a planar landing or support surface. The longitudinal channel 210 thus extends along both the first section 250 and the second section 260.

Along a rear surface of the rear wall 220, a support tab 280 protrudes radially outward therefrom (the support tab 280 can be formed by a stamp process). The support tab 280 is located along a transverse axis that extends through the ledges 270. As described herein, the combined support tab 280 and ledges 270 define a support platform that acts as a strike surface. The ledges 270 thus extend outwardly from one face of the stake 200, while the support tab 280 extends outwardly from the opposite face of the stake 200.

The inward tapering of the second section 260 towards the distal end 202 creates a pointed distal end 202 of the stake 200.

As shown in the figures, the rear wall 220 includes a first slot 295 that extends longitudinally along the first section 250. The first slot 295 is closed at both of its ends with one end being close to the proximal end 204 of the elongated stake 200. The first slot 295 can have a uniform width from one end to the other and in the illustrated embodiment, the first slot 295 has a rectangular shape. The rear wall 220 also includes a first opening 297 that is separate and spaced from one end of the first slot 295. The first opening 297 is located between one end of the first slot 295 and the support tab 280.

While the first opening 297 is shown having a square shape, it can have any number of other shapes.

The stake 100 further includes a stake plate 300 that can also be thought of as being a strike plate. The plate 300 is intended to be disposed about the stake 200 and in particular, seats against the support platform that is defined by the combined support tab 280 and ledges 270. The plate 300 includes an opening 310 that is a through hole and can be centrally located. In the illustrated embodiment, the plate 300 has a square shape and the opening 310 has a square shape that complementary to the shape of the elongated stake 200 since the stake 200 is slidingly received within the opening 310. The stake plate 300 is sized so that it seats on the ledges (shoulders) 270 and the support tab 280 and extends radially outward from these opposing faces of the stake 200. Since the ledges 270 and support tab 280 define a horizontal plane, the stake plate 300 assumes a generally horizontal position when the elongated stake 200 assumes a vertical position.

The stake plate 300 can optionally include a locator element 325 that helps the user orient the stake plate 300 relative to the stake 200. For example, a protrusion 325 can extend inwardly into the opening 310. The locator element 325 is received within the longitudinal channel 210 of the stake 200 for locating the stake plate 300. The footprint of the first section 250 is complementary to the opening 310 (e.g., both square shaped) to allow the stake plate 300 to slide over the first section 250 until the stake plate 300 contacts and seats against the ledges 270 which prevent further longitudinal movement of the stake plate 300. Thus, a portion of the stake plate 300 that lies outside the opening 310 is received on the ledges 270 which serve to fully support the stake plate 300 and maintain it in a horizontal plane as shown in FIG. 1. This stake plate 300 is repeatedly struck by the driving member and thus, must be maintained in position on the ledges during the driving action.

The stake 100 also includes an annular member 400 that is configured to receive and slidingly travel about and along the stake 200 and in particular, the first section 250 thereof. The annular member 400 seats against one side (one face) of the stake plate 300. The annular member 400 thus includes a center opening 410 (that can be circular in shape) and a protrusion or tab 420 extending radially outward from the annular member 400. The tab 420 can be in the form of a finger or the like that extends radially outward and can have a rounded distal free end. Within the tab 420, an opening 425 is formed. The annular member 400 and tab 420 are sized such that when the annular member 400 seats against the stake plate 300, the tab 420 extends beyond one edge of the stake plate 300 such that the opening 425 is beyond the stake plate 300 such that the opening 425 is free and accessible. The opening 425 is sized and intended to receive a connector at one end of a dog leash. Any number of different connectors can be used including but not limited to carabiner types. The connector provides the means for connecting the dog leash to the stake 100.

The stake 100 further includes an elongated impact drive member 500 which can be in the form of an elongated impact drive tube. In the illustrated embodiment, the elongated impact drive member 500 comprises a cylindrical tube that is open along a first end 502 and is preferably closed at an opposite second end 504. The closed second end 504 can include a handle grip 505.

The elongated impact drive member 500 has a center bore that receives the stake 200 and in particular, is configured to receive the first section 250 thereof. The inner diameter of the elongated impact drive member 500 is thus selected so as to allow receipt of the first section 250 of the elongated impact drive member 500.

The elongated impact drive member 500 has a first set of openings 515 and a second set of openings 525. The first set of openings 515 includes a pair of holes that are located 180 degrees apart and similarly, the second set of openings 525 includes a pair of holes that are located 180 degrees apart. The first set of openings 515 are spaced from the open first end 502 and the second set of openings 525 is located between the first set of openings 515 and the open first end 502.

The first set of openings 515 acts as a driving hole set in that during a driving mode of operation in which the elongated impact drive member 500 is moved longitudinally along the stake member 200 and contacts the strike plate 300 to drive the elongated stake member 200 into the ground, the first set of openings 515 are in registration with the first slot 295. A fastener 600 passes through the first set of openings 515 and the first slot 295, thereby coupling (attaching) the impact drive member 500 to the stake member 200 in such away that the impact drive member 500 can still move (slide) longitudinally along the length of the elongated stake member 200 while being attached thereto. The second set of openings 525 acts as a locking hole set in that once the elongated stake member 200 is driven into the ground, the fastener is passed through the second set of openings 525 and the first opening 297 to thereby lock the elongated impact drive member 500 to the elongated stake member 200. The first opening 297 is a discrete small opening as opposed to the longer slot 295 and therefore, when the fastener passes through the first opening 297, the movement of the impact drive member 500 is restricted in the longitudinal direction.

The fastener can be in the form of a fastener 600 that includes a spring 610 that has a first end and an opposing second end that includes a loop 625. The fastener 600 includes a pin 620 that is tethered to the first end of the spring 610 and the second end of the pin 620 is received through the spring loop 625 to connect the pin 620 to the spring 610. The pin 620 is thus configured to pass through the respect openings (holes) 515, 525 formed in the elongated impact drive member 500 and through the slot 295 or the first opening 297.

It will be appreciated that other types of fasteners can be used to couple these two parts and allow for the longitudinal sliding motion described herein.

In use, the elongated stake 200 is driven into the ground using impact drive member 500 and the stake plate 300 rests on the ground with the impact drive member 500 being above the ground and locked in place.

FIGS. 9-11 depict an alternative stake plate 301 for use in the stake 100 in place of stake plate 300. The stake plate 301 can have similar parts as in the stake plate 300 and therefore, like numbers are used. For example, the stake plate 301 has a base portion 303 with an opening 310 formed therein and can include the protrusion 325. The main difference between the stake plate 301 and the stake plate 300 is that the stake plate 301 has a pair of side walls 305. Each side wall 305 can have a triangular shape that terminates in a pointed end 307. The stake plate 301 is positioned in a similar manner in that the stake plate 301 surrounds the stake 200 and acts as a strike surface to which the impact drive member 500 is driven into contact for driving the elongated stake 200. The pointed ends of the side walls 305 provide two additional ground anchoring elements to anchor the entire stake 100 into the ground. As the impact drive member 500 is driven and strikes the strike plate, it not only drives the elongated stake 200 into the ground but also drives the pointed side walls 305 into the ground, thereby providing additional anchoring points and providing a robust anchoring of the stake 100 into the ground. The overall structure 100 is thus anchored into the ground along three separate points, namely, a first point that is defined by one side wall 305, a second point that is defined by the other side wall 305 and a third point that is defined by the elongated stake 200 itself. By having three points, the overall upright structure is robustly anchored into the ground and less susceptible to tipping or tilting, etc.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A stake that is configured to be driven into the ground comprising:
    an elongated stake having a first end section that terminates at a first end and a second end section that terminates at an opposing second end, the elongated stake having a U-shape with a rear wall and two opposing side walls with a longitudinal channel formed between the opposing side walls, a portion of the opposing side walls within the first end section extending out farther from the rear wall than the side walls of the second end section in order to create impact drive shoulders that are formed perpendicular to the rear wall;
    a stake plate that is coupled to the elongated stake and in contact with the impact drive shoulders, the stake plate having a base portion including an opening formed therethrough and a pair of opposing side walls that extend downwardly from the base portion, each side wall of the stake plate having a triangular shape that terminates in a point;
    a hollow impact drive member that slidingly travels along the second end section of the elongated stake for striking the stake plate and driving the first end section into the ground; and
    a fastener for coupling the impact drive member to the elongated stake during a driving action and alternatively for locking the impact drive member in place relative to the elongated stake.

2. The stake of claim 1, wherein the opposing side walls within the first end section comprise tapered side walls that come to a point at the first end of the elongated stake.

3. The stake of claim 1, wherein the base portion of the stake plate comprises a planar plate and the opening formed therethrough allows the second end section of the elongated stake to pass through the opening to permit the stake plate to slide along the second end section into contact with the impact drive shoulders.

4. The stake of claim 3, wherein the stake plate extends radially beyond each side of the second end section of the elongated stake.

5. The stake of claim 3, wherein the stake plate includes an inner protrusion that extends inwardly into the opening for reception within the longitudinal channel.

6. The stake of claim 1, further including a coupling member that surrounds the elongated stake and includes an opening for receiving one end of a dog leash.

7. The stake of claim 6, wherein the coupling member includes a tab protruding radially outward therefrom, the opening being formed through the tab, the tab extending radially outward beyond an outer edge of the stake plate.

8. The stake of claim 7, wherein the coupling member has a base portion from which the tab protrudes, the base portion of the coupling member having a footprint that is fully contained within a footprint of the stake plate.

9. The stake of claim 6, wherein the coupling member is in direct contact with and overlies the stake plate.

10. The stake of claim 1, wherein the impact drive member comprises a hollow tube that has a cross-sectional shape that is different than the stake plate.

11. The stake of claim 1, wherein the impact drive member has a first opening for receiving the fastener for coupling the impact drive member to the elongated stake during the driving action and a second opening for locking the impact drive member in place relative to the elongated stake.

12. The stake of claim 11, wherein the first opening comprises a first set of openings formed in the impact drive member along a first axis and the second opening comprises a second set of openings formed in the impact drive member along a second axis, the first axis being spaced from and parallel to the second axis.

13. The stake of claim 12, wherein the fastener comprises a locking pin and a spring that is attached at a first end to a first end of the locking pin and has a loop formed at a second end of the spring that receives a second end of the locking pin.

14. The stake of claim 13, wherein the second end section of the elongated stake includes a longitudinal slot formed therethrough and a through hole formed proximate but spaced from one end of the longitudinal slot, the locking pin passing through the first set of openings and the longitudinal slot during the driving action and alternatively the locking pin passes through the second set of openings and the through hole when the impact drive member is locked in place relative to the elongated stake.

15. The stake of claim 1, wherein the rear wall of the elongated stake includes a support tab that protrudes outwardly from the rear wall for supporting one end of the stake plate, while an opposite end of the stake plate is supported by the impact drive shoulders.

16. The stake of claim 15, wherein a distal end of the support tab lies within a first plane that contains the impact drive shoulders.

17. A drivable stake for driving into the ground comprising:
an elongated stake having a first end section that terminates at a first end and a second end section that terminates at an opposing second end, the elongated stake having a U-shape with a rear wall and two opposing side walls with a longitudinal channel formed between the opposing side walls, a portion of the opposing side walls within the first end section extending out farther from the rear wall than the side walls of the second end section in order to create impact drive shoulders that are formed perpendicular to the rear wall;
a stake plate that is coupled to the elongated stake and in contact with the impact drive shoulders, the stake plate having a base portion including an opening formed therethrough and a pair of opposing side walls that extend downwardly from the base portion, each side wall of the stake plate having a triangular shape that terminates in a point that is configured to be driven into the ground;
a hollow impact drive member that slidingly travels along the second end section of the elongated stake for striking the stake plate and driving the first end section into the ground; and
a fastener for coupling the impact drive member to the elongated stake during a driving action and alternatively for locking the impact drive member in place relative to the elongated stake in a locked position, the fastener passing through the impact drive member and the elongated stake in such a way that the impact drive member can slide longitudinally over the elongated stake during the driving action.

18. The stake of claim 17, wherein the stake plate comprises a metal structure and the side walls of the stake plate are integrally formed with the base portion, the base portion being a planar structure that has a first portion that rests on the impact drive shoulders and a second portion that rests on a support that protrudes outwardly from an outer surface of the rear wall.

* * * * *